May 5, 1925.                            1,536,054
K. W. BARTLETT
LIQUID TREATING APPARATUS
Filed Dec. 11, 1922
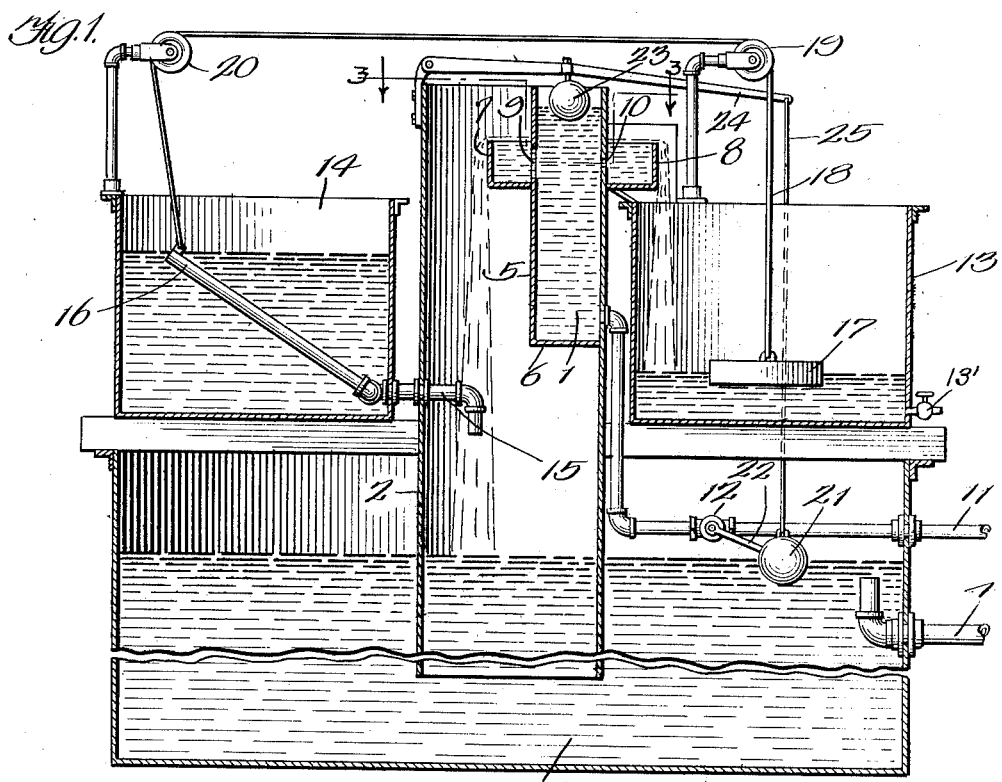
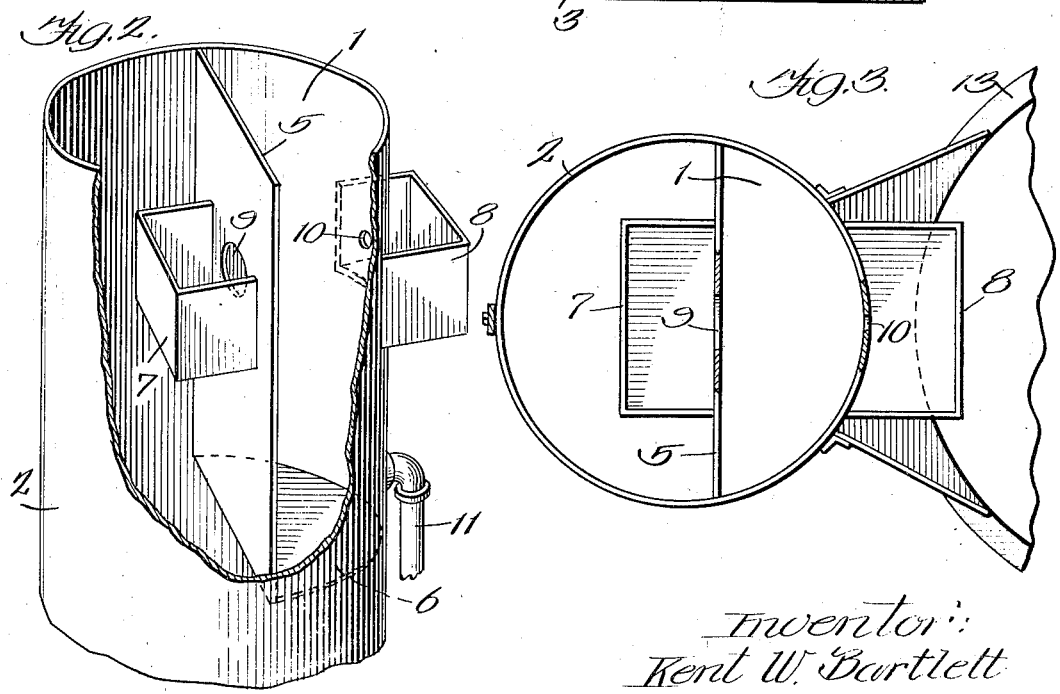
Inventor:
Kent W. Bartlett Patented May 5, 1925.

1,536,054

UNITED STATES PATENT OFFICE.

KENT W. BARTLETT, OF HAMMOND, INDIANA.

LIQUID-TREATING APPARATUS.

Application filed December 11, 1922. Serial No. 606,178.

*To all whom it may concern:*

Be it known that I, KENT W. BARTLETT, citizen of the United States, residing at Hammond, in the county of Lake and State of Indiana, have invented a certain new and useful Improvement in Liquid-Treating Apparatus, of which the following is a full, clear, concise, and exact description.

My invention relates to liquid treating apparatus employing a treatment tank, a chemical tank discharging into the treatment tank and mechanism subject to the liquid to be treated for regulating the flow of chemical into the chemical tank to make the chemical proportionate to the liquid to be treated.

The apparatus of my invention is of particular service when employed in connection with water softening equipment. In such equipment it has hitherto been proposed to subdivide the incoming raw water into a large stream and a small stream, the larger stream flowing into the treatment tank and the small stream operating upon mechanism to regulate the flow of chemical into the treatment tank.

In accordance with one plan these large and small openings have been formed in the bottom of a container into which the water to be treated is discharged on its way for treatment and would satisfactorily function as long as raw water was received in the container to maintain a sufficient height above the container bottom. When the height was reduced to and below a certain point, however, the coefficients of flow of the water through the openings would become disproportionate since the volume of water flowing through the larger opening would be reduced while the volume of water flowing through the smaller opening would remain substantially unchanged. It was also proposed to place these large and small openings in the side of the container but the relative flow would be varied due not only to the change in the height of the water in the container but also due to surface agitation of this water while in the container.

In practicing my invention the incoming water is admitted into a riser that has the large and small openings therein. The larger opening discharges into a container that, in turn, discharges into the treatment or settling tank, this opening being disposed below the upper or limiting level assumed by the liquid in the container before it overflows therefrom into the treatment tank. The smaller opening desirably also discharges into another container that is distinct from the first, though the invention is not to be thus limited. The smaller opening is located below the limiting level of the container to which it is individual, the water overflowing from this container to operate mechanism to vary the flow of the chemical into the treatment tank to keep this chemical flow proportionate to the flow of raw water into the treatment tank.

The invention has other characteristics and will be more fully explained by reference to the accompanying drawing in which Fig. 1 is a vertical sectional elevation of a water softening apparatus as it is preferably constructed to embrace the different features of my invention; Fig. 2 is a perspective view of a part of the equipment shown in Fig. 1 with portions broken away; and Fig. 3 is a sectional view on line 3—3 of Fig. 1.

Like parts are indicated by similar characters of reference throughout the different figures.

The water softening or liquid treating apparatus illustrated includes an incoming receptacle 1 which is desirably formed within and includes a portion of the cylindrical wall of the larger incoming receptacle 2 projecting into the treatment tank 3, the major portions of the chemical reactions occurring in the incoming receptacle 2 to soften the water therein, the softened water flowing to the space surrounding the incoming receptacle 2 and being discharged from the treatment tank through the outlet pipe 4 to be used for the purpose for which the water is softened.

As illustrated, the incoming receptacle 1 includes an upright wall 5 and a bottom wall 6, these two walls being located at the upper portion of the incoming receptacle 2 and co-operating with a portion of the cylindrical wall thereof to form the incoming receptacle 1. I provide two containers 7 and 8 for receiving the raw water from the incoming receptacle 1 which is formed with a larger opening 9 discharging into the container 7 and a smaller opening 10 discharging into the container 8. Each opening is desirably below the limiting level of the container to which it is individual and both openings are desirably below the limiting level of each container.

A supply pipe 11 is connected with the city water main or any other source of raw water that is to be softened, a valve 12 being included in the pipe for regulating the volume of water flowing therethrough. This pipe discharges into the incoming receptacle 1 preferably below the openings 9 and 10 and terminates above the containers 7 and 8 so as to furnish a head to force the flow of water through said openings and over the rims of the containers. The container 7 overflows into the treatment tank and the container 8 overflows into the float tank 13. Chemical is also admitted to the treatment tank from the chemical tank 14 that discharges through the outlet 15. The flow of chemical through the outlet is regulated by the position of the swinging pipe section 16 that is in communication with the outlet 15. As will appear, this swinging pipe section is lowered as the amount of raw water supplied for treatment increases to maintain the proportion of chemical and raw water substantially constant. A float 17 floats in the raw water admitted to the float tank 13. A cable 18 is connected at one end with the float and passes over the pulleys 19 and 20 into connection with the outer or unanchored end of the swinging pipe section 16. Obviously, raw water flows into the treatment tank and float tank in fixed proportion with less water flowing into the float tank than into the treatment tank owing to the difference in the sizes of the openings 9 and 10. As the water in the float tank 13 rises the float 17 will rise to permit the pipe 16 to lower gradually to increase the rate of flow of chemical into the treatment tank. A float 21 floats in the softened water in the treatment tank, this float being carried upon an arm 22 that is coupled with the valve 12 in a manner to decrease the rate of flow of incoming raw water as the float 21 rises. A float 23 floats in the water that is in the incoming receptacle 1. This float is carried upon an arm 24 pivoted at its left end and connected at its right end by a cable 25 with the valve 12 preferably through the intermediation of the float 21 and arm 22. The float 23 serves to move the valve 12 in a closing direction when the water rises in the incoming receptacle 1 above a predetermined level.

The tank 13 is provided with a valve 13' which is opened after each period of operation and enclosed for the commencement of the ensuing period.

While I have herein shown and particularly described the preferred embodiment of my invention I do not wish to be limited to the precise details of construction shown as changes may readily be made without departing from the spirit of my invention, but having thus described my invention I claim as new and desire to secure by letters patent the following:—

1. Liquid treating apparatus including an incoming receptacle having two outlet openings of different size; a container communicating with each outlet which is below the limiting level of the container to which it is individual; a supply pipe for conveying liquid to be treated and discharging into the incoming receptacle; a treatment tank into which the container having the larger opening individual thereto discharges; a chemical tank discharging into the treatment tank; a float tank into which the container having the smaller opening individual thereto discharges; a float in the float tank; mechanism for varying the flow of chemical from the chemical tank and assembled with the float to be operable thereby and so related to the float as to increase the chemical flow as the float rises; a valve in the supply pipe; a float in the treatment tank and assembled with said valve and so related thereto as to decrease the flow of liquid through the supply pipe as this float rises; and a float in the incoming receptacle and also assembled with the valve and so related thereto as to decrease the flow of liquid through the supply pipe when this float rises.

2. Liquid treating apparatus including an incoming receptacle having two outlet openings of different size; a container communicating with each outlet which is below the limiting level of the container to which it is individual; a supply pipe for conveying liquid to be treated and discharging into the incoming receptacle; a treatment tank into which the container having the larger opening individual thereto discharges; a chemical tank discharging into the treatment tank; a float tank into which the container having the smaller opening individual thereto discharges; a float in the float tank; mechanism for varying the flow of chemical from the chemical tank and assembled with the float to be operable thereby and so related to the float as to increase the chemical flow as the float rises; a valve in the supply pipe; and a float in the treatment tank and assembled with said valve and so related thereto as to decrease the flow of liquid through the supply pipe as this float rises.

3. Liquid treating appartus including an incoming receptacle having two outlet openings of different size; a container communicating with each outlet which is below the limiting level of the container to which it is individual; a supply pipe for conveying liquid to be treated and discharging into the incoming receptacle; a treatment tank into which the container having the larger opening individual thereto discharges; a chemical tank discharging into the treatment tank; a float tank into which the container having the smaller opening individual thereto discharges; a float in the float tank; mechanism for varying the flow of chemical from the chemical tank and assembled with the float to be operable thereby and so related to the float as to increase the chemical flow as the float rises; a valve in the supply pipe; and a float in the incoming receptacle and assembled with the valve and so related thereto as to decrease the flow of liquid through the supply pipe when this float rises.

4. Liquid treating apparatus including an incoming receptacle having two outlet openings of different size; a container communicating with each outlet which is below the limiting level of the container to which it is individual; a supply pipe for conveying liquid to be treated and discharging into the incoming receptacle; a treatment tank into which the container having the larger opening individual thereto discharges; a chemical tank discharging into the treatment tank; a float tank into which the container having the smaller opening individual thereto discharges; a float in the float tank; and mechanism for varying the flow of chemical from the chemical tank and assembled with the float to be operable thereby and so related to the float as to increase the chemical flow as the float rises.

5. Liquid treating apparatus including an incoming receptacle having two outlet openings of different size; a container communicating with each outlet which is below the limiting level of the container to which it is individual; a supply pipe for conveying liquid to be treated and discharging into the incoming receptacle; a treatment tank into which the container having the larger opening individual thereto discharges; a chemical tank discharging into the treatment tank; and mechanism for varying the flow of chemical into the treatment tank and having an operating element arranged within actuating influence of the liquid supplied through said pipe, said operating element being arranged to increase the chemical flow as the liquid flow increases.

6. Liquid treating apparatus including an incoming receptacle having two outlet openings of different size; a container communicating with each outlet which is below the limiting level of the container to which it is individual; a supply pipe for conveying liquid to be treated and discharging into the incoming receptacle; a treatment tank into which the container having the larger opening individual thereto discharges; a chemical tank discharging into the treatment tank; and mechanism for varying the flow of chemical into the treatment tank and having an operating element arranged within actuating influence of the liquid supplied through said pipe.

7. Liquid treating apparatus including an incoming receptacle having two outlet openings of different size; a container communicating with each outlet which is below the limiting level of the container to which it is individual; a supply pipe for conveying liquid to be treated and discharging into the incoming receptacle; a treatment tank into which the container having the larger opening individual thereto discharges; a chemical tank discharging into the treatment tank; and mechanism for regulating the discharge of chemical from the chemical tank and governed by the liquid flowing from the container to which the smaller opening is individual.

In witness whereof, I hereunto subscribe my name this 7th day of December, A. D. 1922.

KENT W. BARTLETT.